United States Patent [19]
Kölbl et al.

[11] Patent Number: 5,723,814
[45] Date of Patent: Mar. 3, 1998

[54] SUPPORTING INSULATOR HAVING A TWO-PART INTERLOCKING OUTER RING

[75] Inventors: Gustav Kölbl, Affoltern; Ales Vrana, Richterswil, both of Switzerland

[73] Assignee: Asea Brown Boveri AG, Baden, Switzerland

[21] Appl. No.: 402,959

[22] Filed: Mar. 13, 1995

[30] Foreign Application Priority Data

Apr. 8, 1994 [EP] European Pat. Off. .............. 94105436

[51] Int. Cl.$^6$ .................. H01B 17/26; H01B 17/24; H01B 17/06
[52] U.S. Cl. ............... 174/31 R; 174/167; 174/151; 361/604; 285/368
[58] Field of Search ............... 174/137 R, 151, 174/17 GF, 31 R, 21 JR, 25 G, 158 R, 50.57, 50.59, 16.2, 99 R, 21 C; 561/604, 611, 618, 624, 601, 602, 612, 637–640; 285/368, 412, 413, 414

[56] References Cited

U.S. PATENT DOCUMENTS

| | | | |
|---|---|---|---|
| 1,258,166 | 3/1918 | Vollmann | 277/167.3 |
| 4,024,339 | 5/1977 | Meyer et al. | 174/21 C |
| 4,616,860 | 10/1986 | Faria et al. | 285/336 |

FOREIGN PATENT DOCUMENTS

| | | | |
|---|---|---|---|
| 0288715B1 | 11/1988 | European Pat. Off. . | |
| 0035380 | 3/1979 | Japan | 174/21 C |
| 03003610 | 1/1991 | Japan . | |

*Primary Examiner*—Hyung S. Sough
*Assistant Examiner*—Kamand Cuneo
*Attorney, Agent, or Firm*—Burns, Doane, Swecker & Mathis, L.L.P.

[57] ABSTRACT

A supporting insulator for installation between connecting flanges of a gas-insulated switching installation is provided with an outer ring, with an insulator body which is in the form of a disk and which is formed of a hardened cast resin, and with at least one cast fitting which is subjected to high voltage and is cast in the insulator body. The outer ring need not be assembled with the insulator body until after the outer ring has been colored. The outer ring includes two identically constructed rings that are joined together in a separable, but positively locking manner such that the insulator body can be separated from the outer ring when the rings are separated.

6 Claims, 3 Drawing Sheets

SUPPORTING INSULATOR HAVING A TWO-PART INTERLOCKING OUTER RING

BACKGROUND OF THE INVENTION

1. Field of the Invention

The invention is based on a supporting insulator having an outer ring.

DISCUSSION OF BACKGROUND

A supporting insulator which is constructed in the form of a disk and has an insulator body, which is provided for insertion into gas-insulated switching installations, is known from European Patent Specification 0 288 715 B1. The insulator body can be acted on by a pressure medium. Insulating gases such as $SF_6$, for example, or even mineral oil can be considered as the pressure medium. Furthermore, the insulator could also be acted on by a vacuum. The insulator body, which is constructed in the form of a disk, is composed of a hardened cast resin. A cast fitting, which is used as an electrical conductor in operation and is subjected to high voltage, passes through the insulator body. The insulator body, which is in the form of a disk, is provided with a metallic outer ring externally. As a rule, the cast fitting and the outer ring are cast with the insulator body to form an integrally constructed supporting insulator.

That side of the outer ring which faces away from the cast fitting is a part of the outer surface of the gas-insulated switching installation and must be matched to the colored design of this surface. This matching requires painting of this surface which, however, cannot take place until after the curing of the insulator body after the casting process, which curing takes place at comparatively high temperatures, since the paint which is used for the surface does not withstand these high temperatures. Before painting, the surface to be painted must be degreased, which is expediently done by treating with a liquid solvent. A solvent is selected which does not attack the insulator body, but it is possible only at a relatively high cost to prevent a certain amount of moisture, which is produced from the solvent, in this case penetrating into the insulator body, which would reduce its dielectric capabilities. In addition, during the painting process, paint spray could unacceptably contaminate the surface of the supporting insulator, so that costly covering of the insulating surface is necessary.

SUMMARY OF THE INVENTION

Accordingly, one object of the invention is to provide a novel supporting insulator which is of simple construction and whose outer ring is not assembled with the insulator body until after it has been definitively colored.

The supporting insulator has an outer ring and an insulator body, which is in the form of a disk and is composed of hardened cast resin, with at least one cast fitting which is subjected to high voltage and is cast in the insulator body. The supporting insulator is provided for installation between two connecting flanges of a gas-insulated switching installation. In the case of this supporting insulator, it has been found to be particularly advantageous that the outer ring is joined together in a positively locking manner from at least two identically constructed rings, and that the outer ring is additionally constructed such that it can be separated from the insulator body. As a result of this refinement, it is possible not to assemble the outer ring with the insulator body until after it has been definitively colored.

It has furthermore been found to be advantageous that the at least two rings are provided with means which position the insulator body radially and that the at least two rings are additionally provided with means which temporarily position the insulator body axially. Stops which interact with the connecting flanges and are integrally formed on the insulator body are provided for the definitive axial positioning of the insulator body. This arrangement avoids axially directed shear forces being transmitted between the outer ring and the insulator body.

Particularly simple radial positioning of the insulator body is possible if studs are provided as means which position the insulator body radially, which studs are integrally formed internally on the rings of the outer ring. A collar which is integrally formed internally on the respective ring is in each case provided as means which temporarily position the insulator body axially.

It has been found to be particularly advantageous that the notch effect which acts on the supporting insulator is reduced in that the collar which is integrally formed on the rings forms, together with a flank, which faces the collar, of the respective stop, a groove which is suitable for accommodating a sealing element. This groove thus no longer needs to be completely introduced into the insulator body as is the case, as a rule, for conventional supporting insulators.

The rings have at least one axis of symmetry. Two of the rings can be connected to one another in a positively locking manner if one ring is rotated with respect to the other ring through 180° about the at least one axis of symmetry.

The invention, its development and the advantages which can be achieved with it are explained in more detail in the following text, with reference to the drawings, which illustrates only one possible variant.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Identically acting elements are provided with the same reference symbols in all the figures. All the elements which are not necessary for direct understanding of the invention are not illustrated.

DESCRIPTION OF THE PREFERRED EMBODIMENTS

Figure 1:
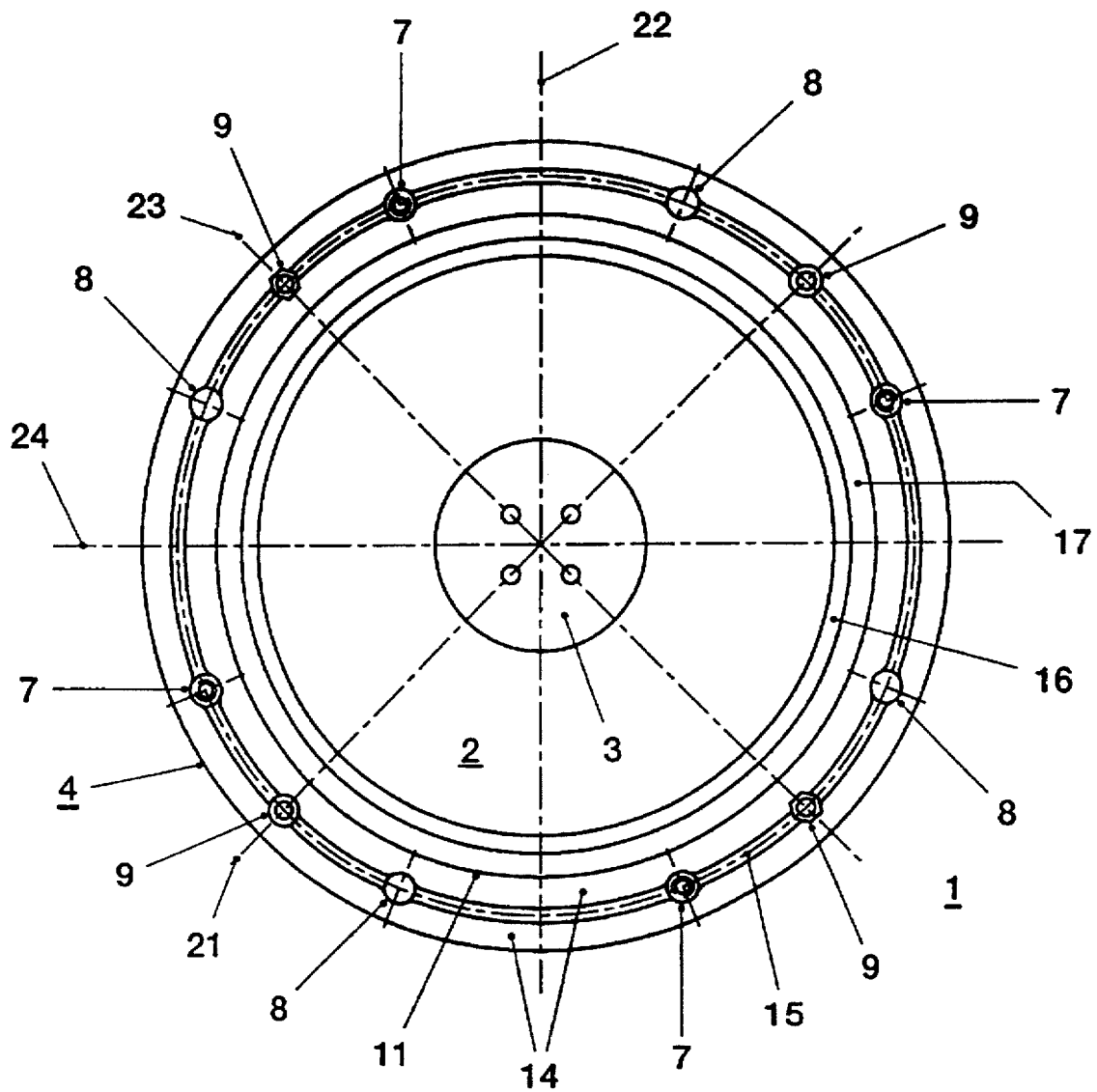
FIG. 1 shows a schematically illustrated side view of a first embodiment of a supporting insulator which is constructed in the form of a disk.

Referring now to the drawings, FIG. 1 shows a schematically illustrated side view of a supporting insulator 1, which is constructed in the form of a disk, as is used, for example, in single-phase gas-insulated switching installations in order to support the active parts with respect to the earthed encapsulation and in order to compartmentalize adjacent gas spaces from one another. This supporting insulator 1 has an insulator body 2 composed of cast resin, in which a cast fitting 3 is cast. For three-phase gas-insulated switching installations, three cast fittings 3, which are suitably spaced apart from one another, are cast in the insulator body. If the adjacent gas spaces are not intended to be compartmentalized from one another, then the insulator body 2 of the supporting insulator 1 has one or more perforations. The insulator body 2, which is here constructed in the form of a disk, is held externally by a two-piece outer ring 4. The insulator body 2 can also have any other flat design instead of a disk form, so that, for example, it can also be constructed in the form of a funnel if a longer surface leakage path is required.

Figure 2:
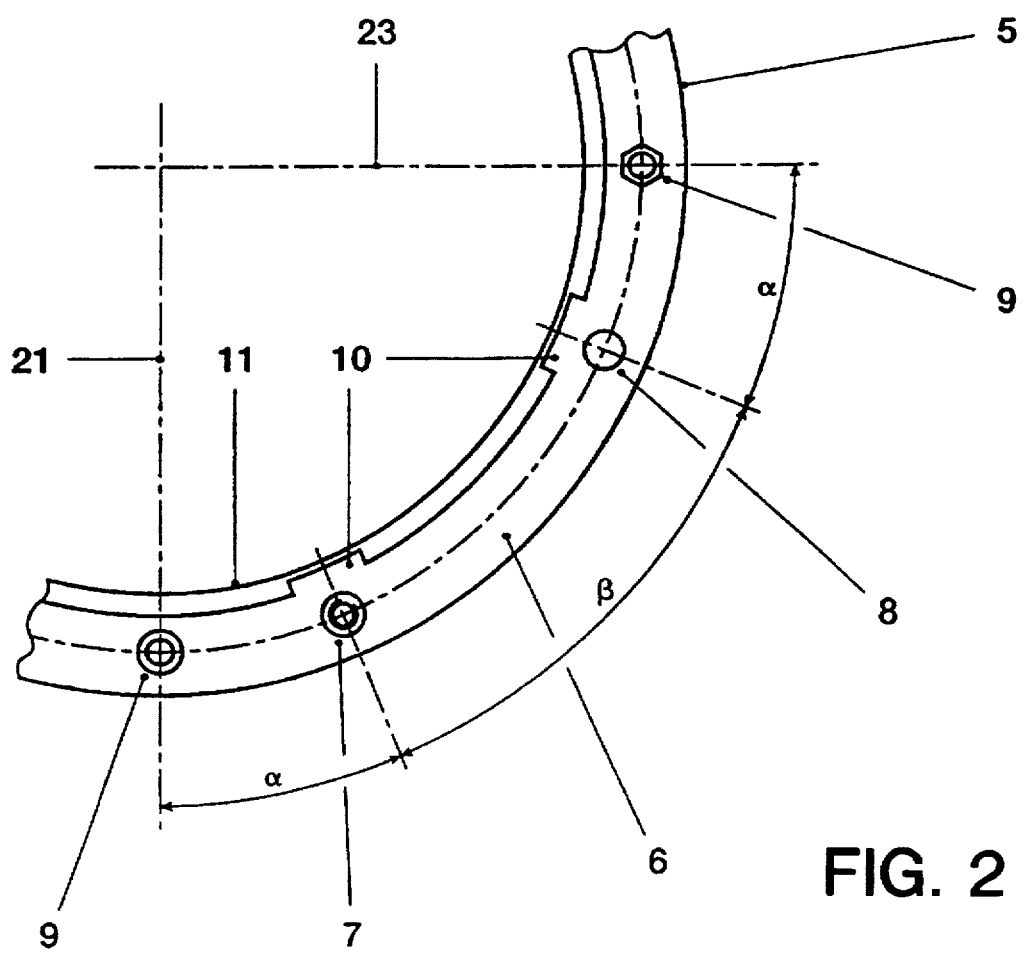
FIG. 2 shows a schematically illustrated view of a part of an outer ring of a supporting insulator which is in the form of a disk.
Figure 3:
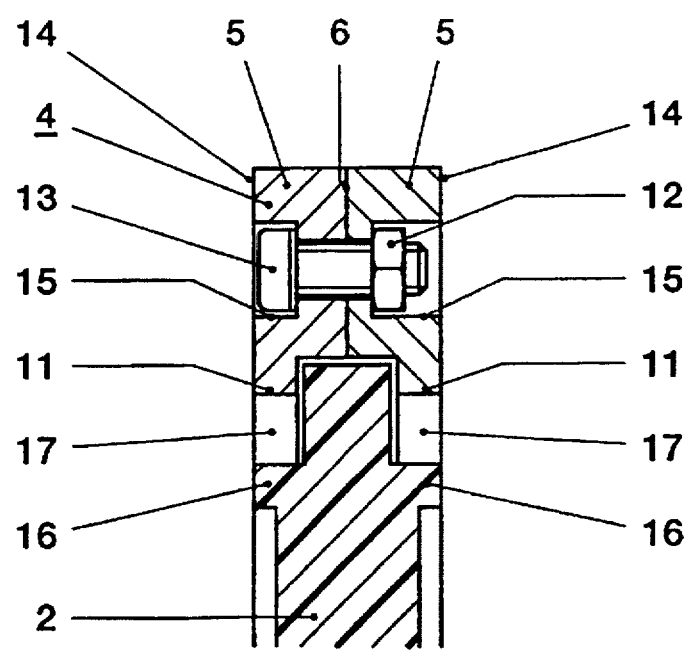
FIG. 3 shows a schematically illustrated partial section through a first embodiment of a supporting insulator which is constructed in the form of a disk.

The outer ring 4 is constructed from two identical metallic rings 5. The rings 5 are advantageously cast from an aluminum alloy. FIG. 2 shows a schematically illustrated segment of a ring 5 which has a joining surface 6. This is a segment of the ring 5 which is located under the ring 5, which is visible in FIG. 1, with the joining surface 6 (FIGS. 2–4) at the top. The joining surface 6 is interrupted by threaded holes 7 and through-openings 8 which run at right angles to it. Furthermore, mounting openings 9 are provided which likewise pass through the joining surface 6 at right angles. In the inward direction toward the insulator body 2, the joining surface 6 is broadened at a plurality of points so that studs 10 are formed there, which are matched to the contour of the outer ring surface of the insulator body 2 so that they take over the radial guidance of the insulator Body 2 after it has been inserted into the first of the two rings. A collar 11 which is integrally formed on the ring 5 prevents the insulator body 2 passing axially through this first ring 5. The second of the rings 5 is brought into face-to-face contact with the first ring 5 so that the holes 7, through-openings 8, studs 19, and depressions 20 on each ring align with the through-openings 8, holes 7, depressions 20, and studs 19, respectively, on the facing ring to form the complete supporting insulator 1, after the insulator body 2 has been inserted between said two rings 5. FIG. 3 illustrates a partial section through a supporting insulator 1 which is assembled in such a manner. The partial section is here positioned such that it passes through one of the mounting openings 9. In this arrangement, the insulator body 2 is only temporarily positioned in the axial direction. The definitive axial positioning of the insulator body 2 does not take place until the supporting insulator 1 has been definitively installed in the gas-insulated switching installation. In the case of the outer ring 4 of this supporting insulator 1, the respective joining surfaces 6 of the two rings 5 lie on one another. The two rings 5 are held together by means of in each case one bolt 13, which is fitted into the mounting openings 9 and is provided with a nut 12. On the side opposite the joining surface 6, each of the rings 5 additionally has a bearing surface 14, which is arranged parallel to the joining surface 6. A groove 15 is introduced into the bearing surface 14, which groove 15 is filled with a corrosion protection grease after installation of the supporting insulator 1 in the gas-insulated switching installation. The groove 15 is constructed such that it is not interrupted by i.e., the groove extends through, the threaded holes 7, the through-openings 8 and the mounting openings 9, even when these holes and these openings are fitted with the components for which they are provided.

Figure 4:
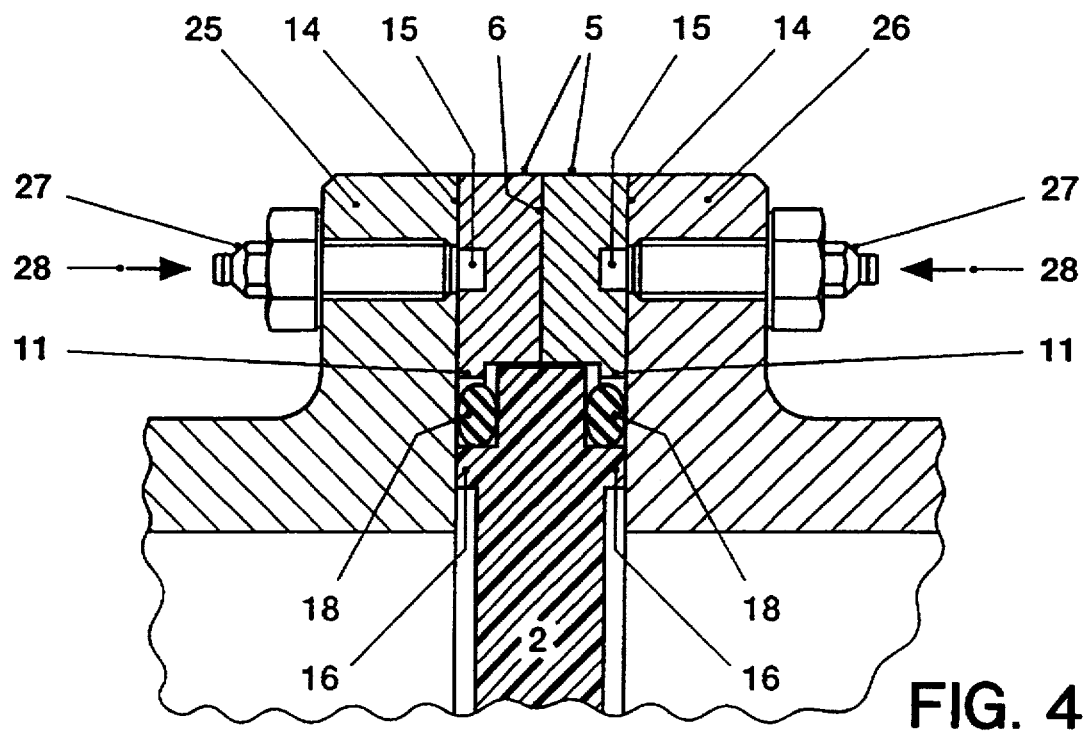
FIG. 4 shows a schematically illustrated first partial section through a supporting insulator which is installed in a gas-insulated switching installation and is constructed in the form of a disk.
Figure 5:
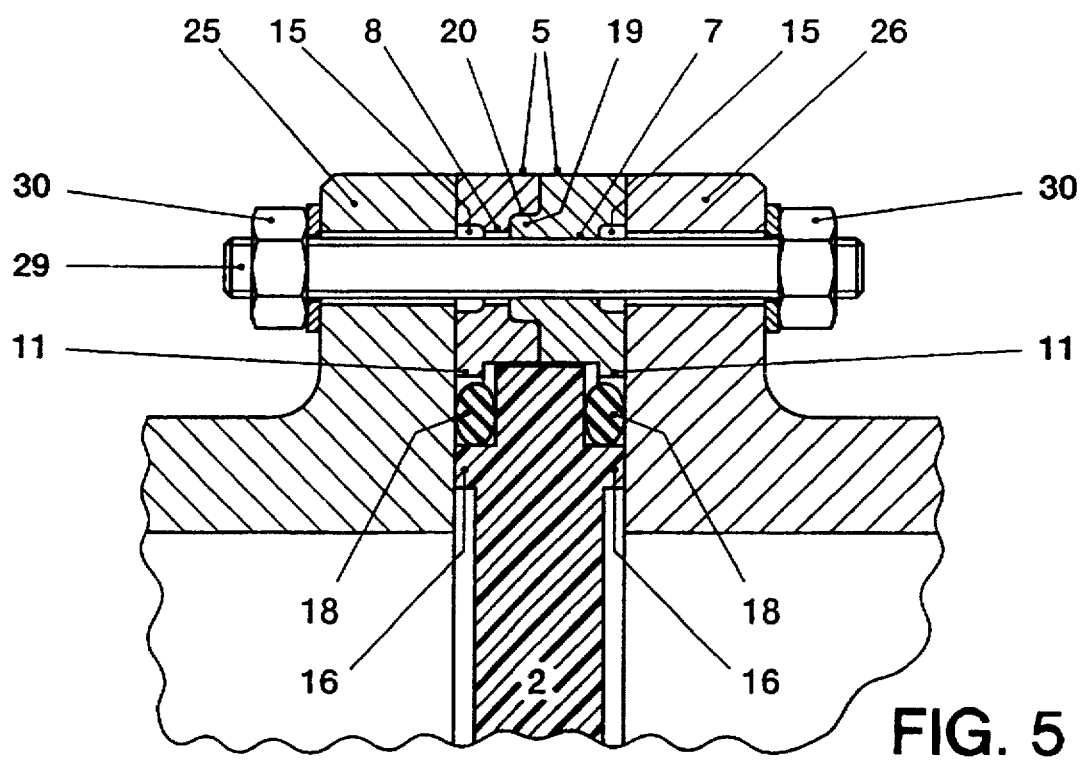
FIG. 5 shows a schematically illustrated second partial section through a supporting insulator which is installed in a gas-insulated switching installation and is constructed in the form of a disk.

As can furthermore be seen from FIG. 3, the insulator body 2 has a circumferential stop 16 in the outer region on both sides. A groove 17 is constructed on each side of the supporting insulator 1, between the stop 16 and the collar 11 of the ring 5, which groove 17 is provided for accommodating an O-ring seal 18, as can be seen in FIGS. 4 and 5. The collar 11 which is integrally formed on the rings 5 forms this groove 17, together with a flank, which faces this collar 11, of the respective stop 16.

The joining surface 6 has a raised stud 19 around the threaded holes 7 and has a depression 20 around the through-openings 8. The stud 19 and the depression 20 fit into one another to engage with each other, as can be seen from FIG. 5. The two rings 5, from which the outer ring 4 is assembled, are thus secured against mutual rotation. Very varied refinements of this positively locking connection are possible.

In the case of the exemplary embodiment shown in FIGS. 1 and 2, an angle α is provided between a mounting opening 9 and the closest threaded hole 7, an angle β is provided between the threaded hole 7 and the closest through-opening 8, and an angle α is provided again between the through-opening 8 and the next mounting opening 9. For this exemplary embodiment, the angle α has a value of brought into 22.5° and the angle β a value of 45°. Four mounting openings 9 are in this case distributed uniformly on the rings 5. If the symmetry requirements are considered, then other values for the angles α and β are also possible, so that the supporting insulator 1 can be designed for any possible diameter of the housings of gas-insulated switching installations. In particular, in the case of relatively large diameters, the relatively large number of flange screw unions which are necessary for reasons of strength and gas tightness can be accommodated. It is also perfectly possible to construct only one, but sensibly at least two, of the pairings of threaded hole 7 and through-opening 8 in a positively locking manner. Furthermore, it appears to be sensible to select the number of mounting openings 9 to be not more than four, although the angles α and β would have to be correspondingly varied if a greater number of flange screw unions were intended to be accommodated.

FIG. 4 illustrates a partial section of a supporting insulator 1 which is mounted between the connecting flanges 25 and 26 of the gas-insulated switching installation. The connecting flanges 25, 26 rest on the bearing surfaces 14 of the rings 5 of the outer ring 4, and press them together. The collar 11 can be constructed such that it is not acted on by the connecting flanges 25, 26. The insulator body 2 is now no longer held by the rings 5 in the axial direction but by the stops 16, which are supported on the connecting flanges 25, 26. The tolerances of this described flange connection are designed in a corresponding manner. Grease nipples 27 which are screwed in the connecting flanges 25, 26 allow corrosion protection grease to be injected into the grooves 15. Arrows 28 indicate the entry of the corrosion protection grease. For completeness, it should also be mentioned here that the joining surfaces 6 are also greased with corrosion protection grease before the two rings 5 are joined together. The insulator body 2 is completely protected against the external atmosphere with the aid of the corrosion protection grease, so that it can absorb no moisture and, in addition, any possible chemical decomposition phenomena on the insulator body are also prevented, with a high level of reliability.

FIG. 5 shows a partial section of a supporting insulator 1, which is mounted between the connecting flanges 25 and 26 of the gas-insulated switching installation. The partial section is positioned such that it passes through a threaded hole 7 and a through-opening 8. A threaded bolt 29 is screwed into the threaded hole 7 and passes through the corresponding mounting opening 8 of the second ring 5 and the corresponding mounting holes which are provided in the connecting flanges 25, 26. Two nuts 30, which are screwed onto the threaded bolt 29, hold the connecting flanges 25 and 26 together with the supporting insulator 1 of the gas-insulated switching installation at this point. A plurality of such threaded bolts 29 are distributed uniformly on the circumference of the connecting flanges 25, 26.

The figures will now be considered in somewhat more detail in order to explain the method of operation. The insulator body 2, which is in the form of a disk, with the cast fitting 3 which is cast in it can be stored in a protective manner, until immediately before installation in the gas-insulated switching installation, in an air-tight sheath which is provided with a means-which absorbs moisture. The rings 5 of the outer ring 4 are processed, degreased and externally painted separately. These processes cannot have any disadvantageous effect on the insulator body 2. Furthermore, the outer ring 4 is separately subjected to the specified pressure test. The insulator body 2 is not removed from the protective sheath and completed with the rings 5 to form a supporting insulator 1 until immediately before installation in the gas-insulated switching installation. This supporting insulator 1 is now immediately installed between the connecting flanges 25 and 26 of the gas-insulated switching installation. After tightening of the flange connections, the grooves 15 are filled under pressure with corrosion protection grease, so that the insulator body 2 is protected against decomposing environmental influences. The greasing of the joining surfaces 6, which is carried out before mounting of the supporting insulator, with corrosion protection grease, completes this protection.

The return current which flows through the encapsulation of the single-phase gas-insulated switching installation now flows correctly from the connecting flange 25 via the bearing surface 14 of the first ring 5 and through this ring 5 via the joining surfaces 6 of the two rings 5 into the second ring 5, and through this second ring 5, and subsequently through its bearing surface 14 into the connecting flange 26. The contact forces which are necessary in this return current path are applied by the flange connections. It is thus particularly advantageous that the insulator body 2 is completely decoupled from these forces.

The stops 16 which are integrally formed on the insulator body 2 pass the forces which act on it in the axial direction directly onto the connecting flanges 25, 26, so that the outer ring 4 does not have these forces applied to it. The outer ring 4 absorbs only the forces which are transmitted by the insulator body 2 in the radial direction and act via the studs 10 on the outer ring 4 as compression forces which can be coped with comparatively easily. The outer ring 4 accordingly need not absorb any shear forces whatsoever.

It is furthermore advantageous that the two rings 5 have the same form, which means a considerable simplification of procurement and storage.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A supporting insulator for installation between two connecting flanges of a switching installation, comprising:
   an outer ring;
   an insulator body, the insulator body being in the form of a disk and being formed of hardened cast resin;
   at least one cast fitting, the cast fitting being cast in the insulator body,
   wherein the outer ring includes at least two identically constructed rings, the at least two rings being separably locked together, and the insulator body is separably locked between the at least two rings when the at least two rings are separably locked together,
   wherein the at least two rings include means which position the insulator body radially, the at least two rings include means which temporarily position the insulator body axially, and, the supporting insulator further including stops, the stops interacting with the connecting flanges and being integrally formed on the insulator body, the stops providing a definitive axial positioning of the insulator body, and
   wherein the radial positioning means includes studs, and the temporary axial positioning means includes a collar integrally formed internally on at least one of the at least two rings.

2. The supporting insulator as claimed in claim 1, wherein the collar, together with a flank of a respective one of the stops, the flank facing the collar, forms a groove, the groove accommodating a sealing element.

3. The supporting insulator as claimed in claim 2, wherein the sealing element is an O-ring seal.

4. The supporting insulator as claimed in claim 1, wherein the at least two rings have at least one axis of symmetry, and wherein two of the at least two rings engage each other after the inner surfaces of the two rings are brought together face-to-face.

5. The supporting insulator as claimed in claim 4, wherein the two rings are connected by at least one detachable connection.

6. The supporting insulator as claimed in claim 5, wherein the at least one detachable connection includes a bolt and a nut.

* * * * *